Patented Dec. 25, 1951

2,579,682

UNITED STATES PATENT OFFICE 2,579,682

METHOD FOR PRODUCING THIOPHANES

Joseph Donald Surmatis, Nutley, N. J., assignor to Hoffmann-La Roche Inc., Roche Park, Nutley, N. J., a corporation of New Jersey No Drawing. Application December 22, 1948, Serial No. 66,847

5 Claims. (Cl. 260—309.7)

The present invention relates to a new method for preparing 3,4-(1',3'-diaralkyl-2'-keto-imidazolido) - 2 - (ω - alkoxyl - alkylidene) - thiophanes. More particularly, the invention involves the conversion of 3,4-(1',3'-diaralkyl-2'-keto - imidazolido) - 2 - hydroxy - 2 - (ω - alkoxy-alkyl)-thiophanes (I) into 3,4-(1',3'-diaralkyl - 2 - keto - imidazolido) - 2 - (ω - alkoxy-alkylidene)-thiophanes (II).

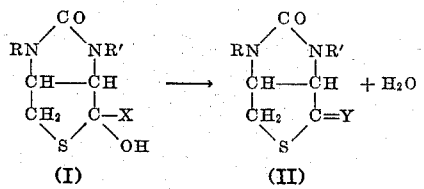

In the above formula, R and R' stand for aralkyl radicals, for example, α-aralkyl radicals, like benzyl and α- or ring-substituted benzyl, for instance, α-methyl, and α-ethyl-benzyl, o-methyl-benzyl, p-ethylbenzyl, p-methoxy-benzyl, and p-ethoxy-benzyl. X stands for an ω-alkoxy-alkyl radical and Y for an ω-alkoxyl-alkylidene radical.

In the applications of Goldberg and Sternbach, Serial No. 673,642, filed May 31, 1946, now Patent No. 2,489,232, and Serial No. 763,447, filed July 24, 1947, now Patent No. 2,489,236, the procedure for converting a compound of type (I) into a compound of type (II) involved dissolving compound (I) in acetic acid and refluxing the mixture from one to two hours. The solution was then concentrated by distillation in vacuo, the residue dissolved in ether or benzene, washed with a dilute aqueous solution of sodium carbonate and the ether or benzene removed under vacuo. Finally, the syrupy solution of the 3,4-(1',3' - diaralkyl - 2' - keto - imidazolido) - 2-(ω-ethoxy-alkylidene)-thiophane was dissolved in methyl alcohol preparatory to hydrogenation to produce other intermediates employed in the final production of biotin.

According to the present invention, I have found that the dehydration of compounds of type (I) into compounds of type (II) takes place directly in a lower alcohol such as methyl alcohol, ethyl, or propyl alcohol, to which a small amount of sulfuric acid has been added. There is thus eliminated the use of the two solvents, acetic acid and ether or benzene, and the two distillations and the accompanying washings heretofore employed. In addition, the reaction product, while in the alcohol, can be directly hydrogenated. Furthermore, the new procedure involves a milder, yet highly efficient type of reaction. In addition to the already mentioned advantages, the new process reduces the amount of time required for carrying out the dehydration as compared with the previous process described in the aforementioned patent applications.

In practicing the invention, the 3,4-(1',3'-diaralkyl - 2' - keto - imidazolido) - 2 - hydroxy-2-(ω-alkoxy-alkyl)-thiophane is dehydrated by dissolving the compound in an alcohol, preferably methanol, adding a small amount of concentrated sulfuric acid, and agitating the solution at preferably reflux temperature. Temperature and time of reaction may be varied over wide limits. However, it is preferred to carry out the reaction by stirring the solution at reflux temperature for about two hours. In this period of time a clear solution of the ω-alkoxy-alkylidene-thiophane is obtained. The sulfuric acid esterifies part of the methyl alcohol to form methyl sulfuric acid which has the formula $CH_3OSO_3H$ and which appears to act as a mild yet efficient dehydration catalyst. When the hydration is completed, the mixture is cooled and the methyl sulfuric acid is neutralized by means of any suitable alkali, such as sodium hydroxide, potassium hydroxide, sodium carbonate, calcium hydroxide and the like.

The amount of sulfuric acid required in the reaction is relatively small, and may, for example, vary from about 2 to 10 per cent of concentrated (98 per cent) sulfuric acid based on the weight of the starting thiophane.

The following examples will serve to illustrate the invention:

Example 1

500 grams of 3,4-(1',3'-dibenzyl-2'-keto-imidazolido) - 2 - hydroxy - 2 - (ω - ethoxy - propyl)-thiophane were placed in a reaction vessel provided with a reflux condenser. To this there were added 1980 cc. of methyl alcohol and 20 cc. of concentrated sulfuric acid in the order named. The reaction vessel was heated for two hours, after refluxing started. The water-clear solution of the dehydration product was allowed to cool and then was treated with a solution of potassium hydroxide in methyl alcohol until a pH of 8-9 was obtained. The final volume was then made up to 5 liters with methyl alcohol. The 3,4-(1',3'-dibenzyl - 2' - keto - imidazolido) - 2 - (ω-ethoxy-propylidene)-thiophane solution could then be directly hydrogenated.

Example 2

500 grams of 3,4-(1',3'-dibenzyl-2'-keto-imidazolido) - 2 - hydroxy - 2 - (ω - ethoxy - propyl)-thiophane were placed in a reaction vessel provided with a reflux condenser. To this were added 1980 cc. of methyl alcohol and 20 cc. of concentrated sulfuric acid. The reaction vessel was heated for two hours. After refluxing started, the solution was allowed to cool and the volume was made up to 5 liters with methyl alcohol. 74 grams of calcium hydroxide were added to the solution and this was allowed to remain for sixteen hours. In this manner, a solution in methyl alcohol of 3,4-(1',3'-dibenzyl-2'-keto-imidazolido)-2-(ω-ethoxy-propylidene)-thiophane was obtained. It can be directly hydrogenated.

Some further examples of compounds which can be prepared by following the procedures of Examples 1 and 2 are:

Z-(ω-methoxy-propylidene)-thiophane
Z-(ω-methoxy-butylidene)-thiophane
Z-(ω-ethoxy-butylidene)-thiophane
Z-(ω-ethoxy-hexylidene)-thiophane These are prepared by starting with the corresponding:

Z-2-hydroxy-2-(ω-methoxy-propyl)-thiophane
Z-2-hydroxy-2-(ω-methoxy-butyl)-thiophane
Z-2-hydroxy-2-(ω-ethoxy-butyl)-thiophane
Z-2-hydroxy-2-(ω-ethoxy-hexyl)-thiophane In each of the compounds above, Z stands for the radical: 3,4-(1',3'-dibenzyl-2'-keto-imidazolido).

The 3,4-(1',3'-diaralkyl-2'-keto-imidazolido)-2-hydroxy-2-(ω-alkoxy-alkyl)-thiophanes employed as starting materials can be prepared in the manner described in the above-mentioned Goldberg and Sternbach patent applications. The following examples illustrative of the procedure are taken from the aforesaid applications.

*1,3 - dibenzyl - imidazolidone - (2) - cis - 4,5 - dicarboxylic acid and its anhydride*

To a stirred, ice-cooled solution of 648 grams (1.98 moles) of bis-benzyl-aminosuccinic acid in 2 liters 3 N potassium hydroxide, are added in small portions (within 1½ hours) 1.6 liters of a 3.75 molar solution of phosgene in xylene (=6 Moles COCl₂) and 2.7 liters 6 N potassium hydroxide (=14 moles). The mixture is then acidified with concentrated hydrochloric acid, and the formed precipitate filtered off and washed with water. The precipitate is then washed thoroughly with hot alcohol, and the aqueous filtrate is extracted several times with ethyl acetate. The alcoholic solution and the ethyl acetate extract contain all the imidazolidone-dicarboxylic acid formed. The alcohol insoluble part of the precipitate is pure starting material (220 grams=0.65 mole). The alcoholic and ethyl acetate solutions are taken to dryness, and the residue is refluxed with benzene until it becomes completely crystalline. The cooled mixture is filtered; the main part of the dibenzyl-imidazolidone-dicarboxylic acid remains on the funnel (283 grams=0.8 mole). It can be recrystallized from ethyl acetate. Prisms, melting first at 167° C., then resolidifying again and melting at 236° C.

The benzene mother liquor is concentrated in vacuo, and the rest of the reaction product is isolated in form of its anhydride in the following way: The oily residue is refluxed with acetic anhydride, then the mixture is concentrated and benzene is added. The anhydride formed crystallizes in nice needles. Melting point is 236–237° C.

*Acetate of the cyclic form of 1,3-dibenzyl-cis-4-carboxy-5-formyl-imidazolidone-2 3,4-(1',3'-dibenzyl - 2' - keto - imidazolido) - 2 - keto - 5-acetoxy-tetrahydrofuran*

A mixture of 100 grams of the anhydride of 1,3 - dibenzyl - imidazolidone - cis - 4,5 - dicarboxylic acid, 150 grams zinc dust, 100 grams zinc powder (40 mesh), 1500 cc. acetic anhydride and 500 cc. acetic acid is stirred and refluxed for 10–15 hours. The dicarboxylic acid can be used instead of the anhydride. In that case the acid is first mixed with the acetic anhydride, refluxed for 10 minutes and then the other constituents are added. The amounts of acetic acid and anhydride can be reduced to about ½ without affecting the yield. If too little is used, the yield is reduced. After that time, the mixture is cooled, filtered and the precipitate on the funnel washed with ethyl acetate. The filtrate is concentrated in vacuo, and the oily or partly crystalline residue is treated with ice water and ethyl acetate, until all the organic substance is dissolved. The ethyl acetate layer is washed with water, dried with sodium sulfate and concentrated in vacuo. The oily or partly crystalline residue is boiled up with acetic anhydride, in order to reconvert any of the compound decomposed during the treatment with water into the cyclic acetate. The mixture is again concentrated in vacuo. Xylene is then added to the residue, and part of it is distilled off in vacuo, then ether and petrol-ether are added. The reaction product separates in fine needles or prisms, which melt at 103–104° C. After drying, the melting point is 124–125° C.

*Thiolactone of 1,3-dibenzyl-cis-4-carboxy-5-mercaptomethyl-imidazolidone-2*

*3,4 - (1',3'-dibenzyl-2'-keto-imidazolido) -2-keto-thiophane*

A vigorous stream of hydrogen chloride and hydrogen sulfide is passed through a suspension of 150 grams of the acetate of the cyclic form of 1,3 - dibenzyl-cis-4-carboxy-5-formyl-imidazolidone-2 in 850 cc. absolute alcohol cooled to −10 to −20° C. After about 1½ hours, most of the starting material is dissolved. To complete the reaction, hydrogen chloride and hydrogen sulfide are passed through the solution for another hour. The solution is then concentrated in vacuo, at the lowest possible temperature and with exclusion of moisture. Some toluene is added to the residue and distilled off in vacuo, thus removing most of the hydrogen chloride still present.

The residual oil is dissolved in 1200 cc. of a suspension of potassium hydrosulfide in alcohol. (This suspension is prepared by saturating a mixture of 672 grams potassium hydroxide and 4 liters of alcohol with hydrogen sulfide.) The mixture is left at room temperature for 15 hours, then refluxed for 1 hour, poured on ice and acidified with dilute sulfuric acid. The organic part is extracted with ether, the solution is dried with sodium sulfate and concentrated in vacuo. The residue is reduced in a stirred refluxing mixture of 900 grams zinc dust, 150 grams granulated zinc (20 mesh) and 2.3 liters acetic acid. After 4 hours, the solution is filtered, and the mixture of zinc and zinc acetate remaining on the funnel is washed with ether and water. The filtrate is concentrated in vacuo and diluted with ether and 40 per cent sulfuric acid until clear separation takes place. The ether layer is separated, washed with water and concentrated in vacuo to a small volume. After 24–48 hours the mixture becomes crystalline. It is then diluted with some more ether and filtered. Melting point 123–124° C.

The thiolactone can be recrystallized from a mixture of acetone, ether and petrol-ether. The pure compound forms colorless plates melting at 126–127° C. It is soluble in strong alkali, and gives a positive mercaptan test with sodium nitroprusside.

3,4-(1',3'-dibenzyl-2'-keto-imidazolido)-2-hydroxy-2-(ω-ethoxy-propyl)-thiophane A Grignard solution, prepared from 13.6 cc. of 3-ethoxypropyl-bromide and an excess of magnesium (4.8 grams) in 30 cc. of ether and 10 cc. of benzene, is diluted with benzene, decanted from the unreacted magnesium and added dropwise (in about 30 minutes) to a boiling, stirred solution of 27 grams of 3,4-(1',3'-dibenzyl-2'-keto-imidazolido)-2-keto-thiophane in 350 cc. of benzene. The solution is refluxed for another 3½ hours. The mixture is then decomposed with ice and dilute sulfuric acid, the organic layer is separated and concentrated in vacuo. The residue is dissolved in methanol and heated to 50° C. with an excess of aqueous sodium hydroxide solution. Ether and water are added, and the two layers are separated. The alkaline aqueous solution contains the unreacted thiolactone, which is extracted and recovered after acidification. The ether layer, containing the reaction product, is dried and concentrated in vacuo. The residue is crystallized from ether-petrol ether.

The product is soluble in strong alkali and gives a positive mercaptan test with sodium nitroprusside. It can be recrystallized from a mixture of acetone, ether and petrol-ether. Prisms melting at 114.5–115.5° C. are obtained.

3,4(1',3'-dibenzyl-2'-keto-imidazolido)-2-hydroxy-2-(ω-methoxy-butyl)-thiophane or in its open form 1,3-dibenzyl-cis-4-mercaptomethyl-5-(ω-methoxy-valeryl)-imidazolidone-2

A Grignard solution prepared from 8.3 grams (50 m. moles=6.5 cc.) of 4-methoxybutylbromide and an excess of magnesium (2.4 grams) in 15 cc. ether and 5 cc. benzene is diluted with benzene, poured off the unreacted magnesium and added dropwise (in about 30 minutes) to a boiling, stirred solution of 13.5 grams (40 m. moles) of the thiolactone in 160 cc. benzene. The solution is then kept refluxing for another 2½ hours. The mixture is decomposed with ice and dilute sulfuric acid, the organic layer is separated and concentrated in vacuo. The residue is dissolved in methanol and heated to 50° C. with an excess of aqueous sodium carbonate solution. Ether and water are added, and the two layers separated. The alkaline aqueous solution contains the unreacted thiolactone which is extracted and recovered after acidification (1.0 gram). The ether layer, containing the reaction product, is dried and concentrated in vacuo. The residue is recrystallized from ether-petrol ether.

The product is soluble in strong alkali and gives a positive mercaptan test with sodium nitroprusside. It can be recrystallized from a mixture of acetone, ether and petrol ether. Prisms melting point 110.5–112° C.

3,4-(1'3'-dibenzyl-2'-keto-imidazolido)-2-hydroxy-2-(ω-ethoxy-butyl)-thiophane or in its open form 1,3-dibenzyl-cis-4-mercaptomethyl-2-(ω-ethoxy-valeryl)-imidazolidone-2.

A Grignard solution, prepared from 8.5 grams 4-ethoxy-butylbromide and an excess of magnesium (2.4 grams) in 15 cc. of ether and 5 cc. of benzene, is diluted with benzene, decanted from the unreacted magnesium and added dropwise (in about 30 minutes) to a boiling, stirred solution of 13.5 grams of 3,4-(1',3'-dibenzyl-2'-keto-imidazolido)-2-keto-thiophane in 160 cc. of benzene. The solution is then kept refluxing for another 2½ hours. The mixture is decomposed with ice and dilute sulfuric acid, the organic layer is separated and concentrated in vacuo. The residue is dissolved in methanol and heated to 50° C. with an excess of aqueous sodium hydroxide solution. Ether and water are added, and the two layers are separated. The alkaline aqueous solution contains the unreacted thiolactone, which is extracted and recovered after acidification. The ether layer containing the reaction product is dried, and concentrated in vacuo. The residue is recrystallized from a mixture of acetone, ether and petrol ether, and forms thick plates melting at 115–115.5° C.

By reacting the 3,4-(1',3'-dibenzyl-2'-keto-imidazolido)-2-ketothiophane with the Grignard solution prepared from 6-ethoxy-hexyl-bromide and magnesium in the same manner as described above, there is also obtainable 3,4-(1',3'-dibenzyl-2'-keto-imidazolido)-2-hydroxy-2-(ω-ethoxy-hexyl)-thiophane.

I claim:

1. A process which comprises dehydrating at about reflux temperature a 3,4-(1',3'-diaralkyl-2'-keto-imidazolido-2-hydroxy-2-(ω-alkoxy-alkyl)-thiophane in a lower aliphatic alcohol to which from about 2 per cent to about 10 per cent of sulfuric acid based on the weight of the aforesaid thiophane has been added, so as to produce 3,4-(1',3'-diaralkyl-2'-keto-imidazolido)-2-(ω-alkoxy-alkylidene)-thiophane.

2. A process which comprises dehydrating at about reflux temperature a 3,4-(1',3'-diaralkyl-2'-keto-imidazolido-2-hydroxy-2-(ω-alkoxy-alkyl)-thiophane in methyl alcohol in the presence of methyl sulfuric acid as a catalyst so as to produce 3,4-(1',3'-diaralkyl-2'-keto-imidazolido)-2-(ω-alkoxy-alkylidene)-thiophane.

3. A process which comprises dehydrating at about reflux temperature 3,4-(1',3'-dibenzyl-2'-keto-imidazolido)-2-hydroxy-2-(ω-ethoxy-propyl)-thiophane dissolved in methyl alcohol to which from about 2 per cent to about 10 per cent of sulfuric acid based on the weight of the aforesaid thiophane has been added so as to produce 3,4-(1',3'-dibenzyl-2'-keto-imidazolido)-2-(ω-ethoxy-propylidene)-thiophane.

4. A process which comprises subjecting 3,4-(1',3'-dibenzyl-2'-keto-imidazolido)-2-hydroxy-2-(ω-ethoxy-propyl)-thiophane to dehydration in methyl alcohol in the presence of methyl sulfuric acid as a catalyst at about reflux temperature so as to produce 3,4-(1',3'-dibenzyl-2'-keto-imidazolido)-2-(ω-ethoxy-propylidene)-thiophane.

5. A process which comprises dehydrating at about reflux temperature 3,4-(1',3'-dibenzyl-2'-keto-imidazolido)-2-hydroxy-2-(ω-methoxy-butyl)-thiophane in methyl alcohol in the presence of methyl sulfuric acid as a catalyst so as to produce 3,4-(1',3'-dibenzyl-2'-keto-imidazolido)-2-(ω-ethoxy-propylidene)-thiophane.

JOSEPH DONALD SURMATIS.

REFERENCES CITED

The following references are of record in the file of this patent:

UNITED STATES PATENTS

| Number | Name | Date |
|---|---|---|
| 1,065,159 | Merling et al. | June 17, 1913 |